United States Patent
Tounou

(10) Patent No.: US 9,210,032 B2
(45) Date of Patent: Dec. 8, 2015

(54) NODE FAILURE MANAGEMENT

(71) Applicant: International Business Machines Corporation, Armonk, NY (US)

(72) Inventor: Antoine A. Tounou, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 13/887,815

(22) Filed: May 6, 2013

(65) Prior Publication Data

US 2014/0331077 A1  Nov. 6, 2014

(51) Int. Cl.
G06F 11/07  (2006.01)
H04L 29/14  (2006.01)
G06F 11/20  (2006.01)

(52) U.S. Cl.
CPC ............... *H04L 29/14* (2013.01); *G06F 11/20* (2013.01); *H04L 69/40* (2013.01)

(58) Field of Classification Search
CPC ............ G06F 11/2023; G06F 11/2033; G06F 11/2041; G06F 11/1028; G06F 11/1428
USPC .......................................... 714/3, 13, 5.11, 10
See application file for complete search history.

(56) References Cited

U.S. PATENT DOCUMENTS

| | | | |
|---|---|---|---|
| 7,958,392 B2 | 6/2011 | Armstrong et al. | |
| 2005/0022047 A1* | 1/2005 | Chandrasekaran | 714/4 |
| 2008/0313369 A1* | 12/2008 | Verdoorn et al. | 710/62 |
| 2011/0173493 A1 | 7/2011 | Armstrong et al. | |
| 2012/0330898 A1* | 12/2012 | Bk et al. | 707/659 |
| 2014/0046535 A1* | 2/2014 | Hinnant et al. | 701/34.4 |

OTHER PUBLICATIONS

Anselmi et al. "IBM Power 570 Technical Overview and Introduction", IBM Redpaper, IBM International Technical Support Organization (ITSO), © Copyright IBM Corp. 2008.

Westphal et al., "IBM System Storage D58000 Architecture and Implementation", IBM Redbooks, IBM International Technical Support Organization (ITSO), Third Edition, Nov. 2012, © Copyright International Business Machines Corporation 2011-2012.

* cited by examiner

*Primary Examiner* — Chae Ko
(74) *Attorney, Agent, or Firm* — Scott A. Berger; Robert M. Sullivan

(57) ABSTRACT

A method and computer-readable storage media are provided for managing resources of a first node. The method may include detecting a failure in a first node. The first node may include one or more cores and supporting resources. The method may further include determining that one or more cores in the first node survived the failure. The method may further include determining that any supporting resources survived the failure. The method may also include reconfiguring a second node to add the surviving supporting resources of the first node using communication interface between the first and second node if the determinations found a surviving core and surviving supporting resource in the first node.

20 Claims, 2 Drawing Sheets

NODE FAILURE MANAGEMENT

TECHNICAL FIELD

This disclosure generally relates to computing systems, and in particular, to resource management upon a failure.

BACKGROUND

Modern computer systems, such as servers, may have one or more cores. Each core may have a variety of supporting resources in communication and available to it. This may include memory subsystems that may include main memory, cache, and memory controllers and buffers. The memory subsystems may be one place where the computer holds current programs and data that are in use by the cores. In computer systems with more than one core, a variety of memory subsystems may be used some shared between cores others assigned or structured to support a single core.

SUMMARY

In one embodiment, a method is provided for managing resources of a first node. The method may include detecting a failure in a first node. The first node may include one or more cores and supporting resources. The method may further include determining that one or more cores in the first node survived the failure. The method may further include determining that any supporting resources survived the failure. The method may also include reconfiguring a second node to add the surviving supporting resources of the first node using communication interface between the first and second node if the determinations found a surviving core and surviving supporting resource in the first node.

In another embodiment, a computer-readable storage media is provided for managing resources of a first node. The computer-readable storage media may provide for detecting a failure in a first node. The first node may include one or more cores and supporting resources. The computer-readable storage media may further provide for determining that one or more cores in the first node survived the failure. The computer-readable storage media may further provide for determining that any supporting resources survived the failure. The computer-readable storage media may further provide for reconfiguring a second node to add the surviving supporting resources of the first node using communication interface between the first and second node if the determinations found a surviving core and surviving supporting resource in the first node.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

Figure 1:
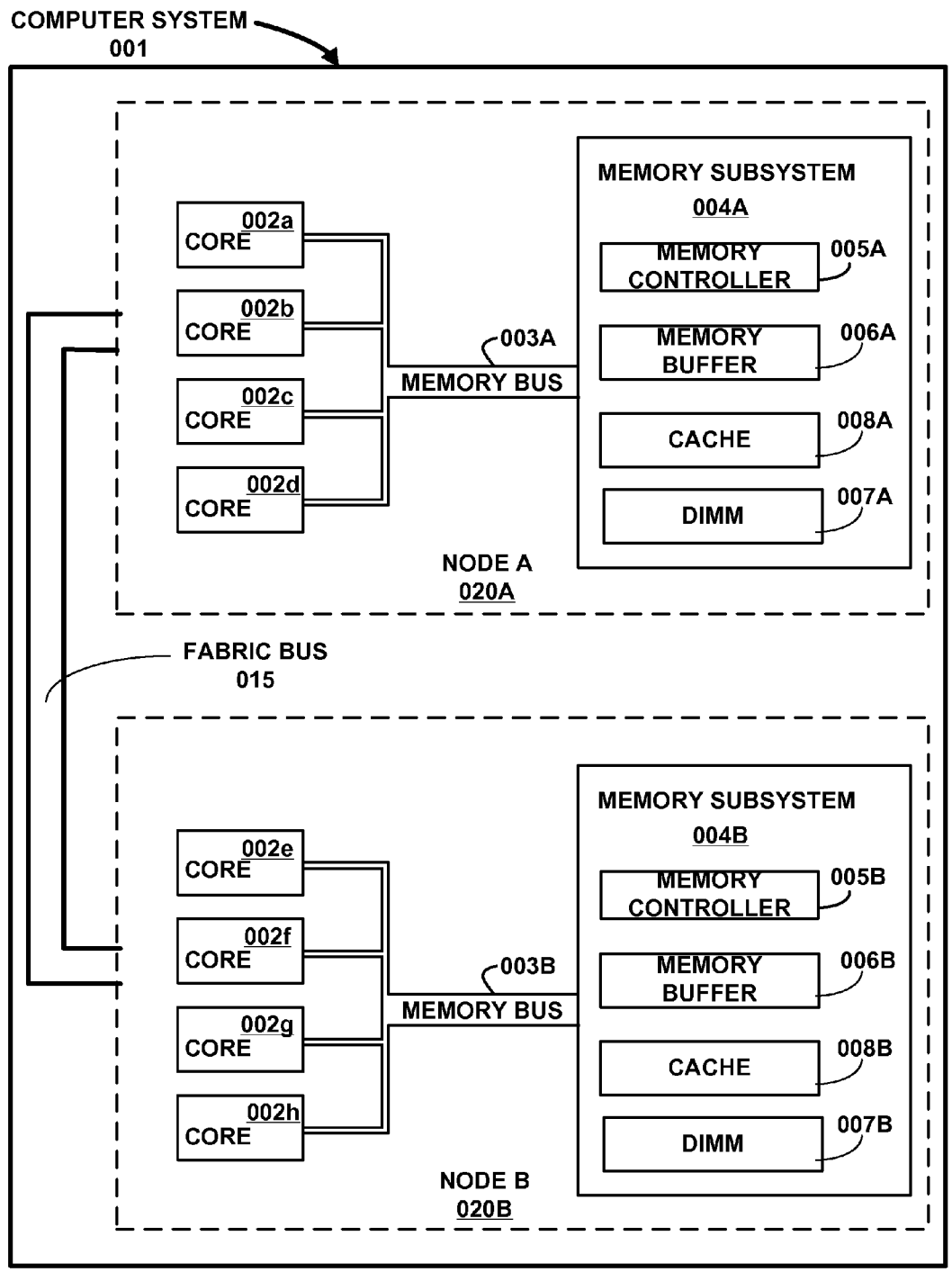
FIG. 1 depicts a high-level block diagram of an example system for implementing an embodiment of the invention.

In many computer and electronic systems a plurality of nodes may be used. The node may be a subset of computer's hardware resources, virtualized as a separate computer. In an embodiment, a node may be a processor card for a server that may contain multiple processor cards. Nodes may contain one or more cores. The node may also include supporting resources such as memory, cache, communication buses, and firmware designed to support the node as it operates performing tasks. On embodiments of nodes that have multiple cores the supporting resources may be shared and accessed by all the cores in the node.

A single computer system, such as a server, may be partitioned into multiple logical partitions (Lpar) with each possibly hosting a separate operating system. Each Lpar may be made up of a partial node, a single node, or several nodes. In many systems a failure in either a core or the supporting resources of a node may result in the loss of the entirety of the resources of the node to the computer system, including any Lpars. Embodiments of the presented invention may allow for surviving supporting resources in a node with a failure to be accessed and used by a second node. This may increase the efficiency or performance of the computer system when failures in nodes occur.

In some embodiments, nodes may be managed by the processor resource/system (PR/SM) manager or facility. In other embodiments, nodes may be managed by a power hypervisor. The hypervisor may act as a virtual switch between the nodes and also may handle the virtual SCSI traffic between nodes. In some embodiments, changes to a running node may be made dynamically. The changing of resource allocations in and of nodes without restart of the node may be called dynamic logical partitioning. Nodes may safely allow combining multiple test, development, quality assurance, and production work on the same server, offering advantages such as lower costs, faster deployment, and more convenience.

In some embodiments, nodes may have a memory subsystem that may contain memory, memory controller, cache, or memory buffer. In various embodiments, these elements may be part of the core or cores or separate entities in the node. The node may also have access to a shared resourced system external to the node. In various embodiments, nodes may have access to cores and supporting resources on other nodes when they are grouped in Lpars. Multiple nodes may be connected by a communication interfaces allowing for the nodes to communicate and share information and resources. One example of communication interfaces may be a fabric bus. A fabric bus may allow for the sharing, combining, and distribution of resources and work among nodes in a computer system. When a failure occurs in part of a node system all of the resources inside the node, that are node specific, may be unavailable to the computer system. In various embodiments of the presented invention the use of surviving elements, or surviving supporting resources, such as the memory subsystem, may remain accessible to the computer system by using communication interfaces between nodes after a failure.

In various embodiments, memory, such as DIMMs in a first node may be used as cache for a second node. This may allow be done for redundancy, in case of a failure in one node, or for workload balance, or to improve systems speed by freeing up resources in a node by using resources of another node. When a node has a failure these advantages may be lost as the use of the resources on the node may be unavailable. Embodiments of the presented invention may allow for those resources to continue being available to other nodes when a failure occurs in the first node.

FIG. 1 depicts a high-level block diagram of an example computer system 001 for implementing an embodiment of the invention. For the purposes of this disclosure, computer system 001 may represent practically any type of computer, computer system, or other programmable electronic device, including but not limited to, a client computer, a server computer, a portable computer, a handheld computer, an embedded controller, etc. In some embodiments, computer system 001 may be implemented using one or more networked computers, e.g., in a cluster or other distributed computing system.

The computer system 001 may include, without limitation, two or more nodes. In the illustrated embodiment, the computer system has a first node, node A 020A and a second node, node B 020B. In an embodiment of the invention, node A 020A and node B 020B may each be a processor card. The computer system 100 may also include a fabric bus 015 connecting node A 020A and node B 020B. In various embodiments, the fabric bus 015 may also be referred to as a switch fabric bus. In various embodiments, the fabric bus 015 may be used to provide for communication between the nodes.

In the illustrated embodiment, each node, 020A and 020B contain respective cores 002a-002d and 002e-002h, and respective supporting resource systems including memory bus 003A and 003B, and memory subsystem 004A and 004B. In various embodiments, the cores 002 may be referred to as processors, central processing units (CPU), or chips. In various embodiments, the individual nodes may contain varying numbers of cores. In the illustrated embodiment, each node is shown with 4 cores 002a-002d and 002e-002h. In other embodiments, the number of cores in each node may vary and may be unequal. In the illustrated embodiment, the memory subsystems 004A and 004B include memory controllers 005A and 005B, memory buffers 006A and 006B, caches 008A and 008B, and DIMM 007A and 007B respectively.

In the illustrated embodiment, the DIMM 007A and 007B may be used as examples of memory that may be used. The memory may be of any random access memory type, e.g., Static Random Access Memory (SRAM), Dynamic Random Access Memory (DRAM), read-only memory, or flash memory. As previously mentioned, other embodiments may expand or reduce the elements in the memory subsystems 004A and 004B. Various elements of the memory subsystem illustrated may be internal to one or more cores, external to the node, more numerous, or absent from individual systems and nodes. Additional supporting resources are contemplated and considered in the scope of the invention.

Figure 2:
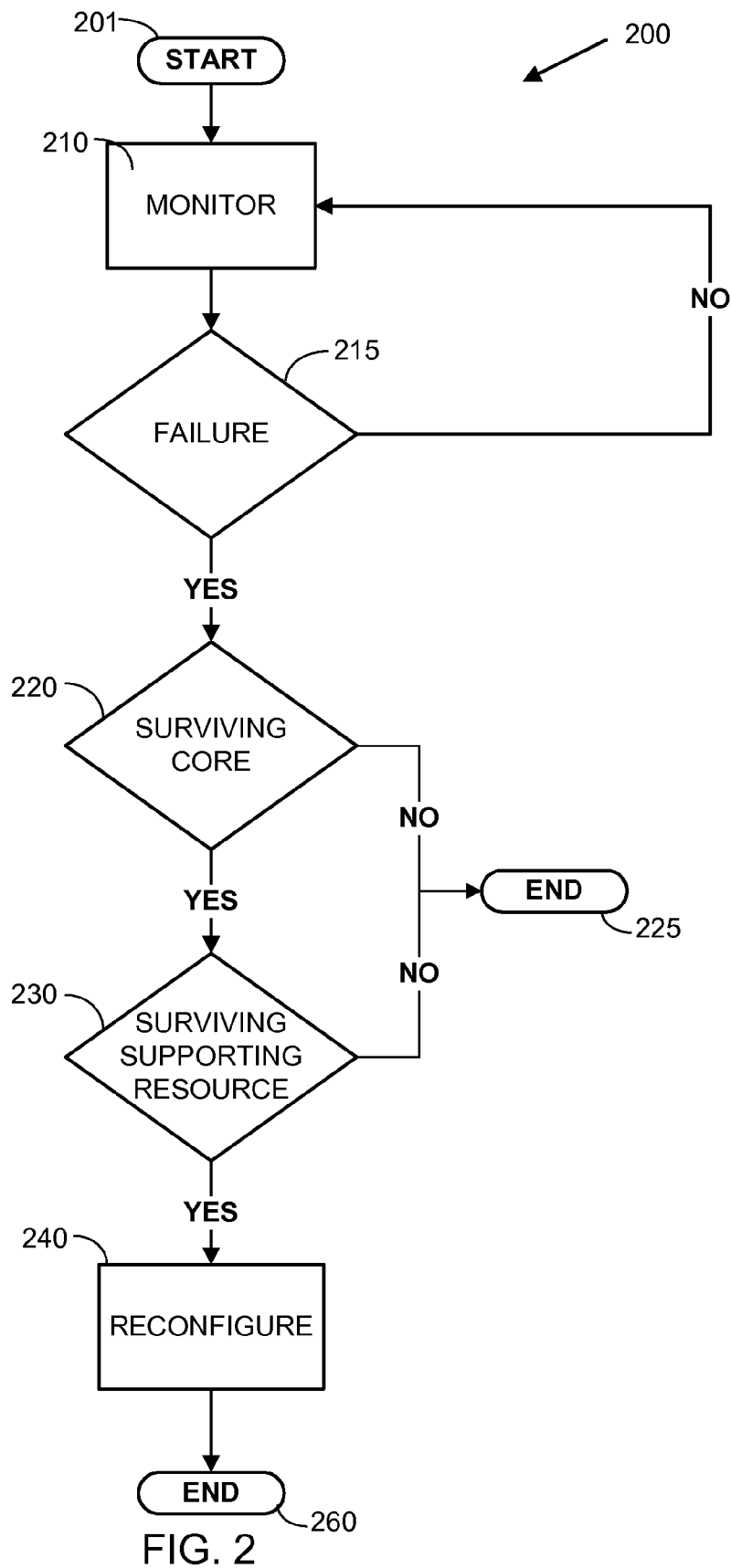
FIG. 2 is a flowchart illustrating a method for managing a first node's resources upon a failure inside the first node, according to an embodiment of the invention.

FIG. 2 is a flowchart illustrating a method for managing a first node's resources upon a failure inside the first node, according to an embodiment of the invention. The method may start at block 201. In block 210, the first node, node A 020A, is monitored for a failure. In various embodiments, the failure monitored for would be one that would eliminate or prevent the use of node A 020A by the computer system 001. The failure may be determined by any technology typically used to determine failures in nodes, processors, or memory systems. In various embodiments, the failures may be caused by hardware failure or microcode errors. In various embodiments, the error may also be that the node is told to go into a service mode, thus fencing the node from the rest of the computer system. In various embodiments, the monitoring for failures may be done by a variety of elements such as software, hardware, or firmware. Various types of software, hardware, or firmware may be used to monitor for various types of failures or a spectrum of failure types.

In block 215, the method may include a determination that a failure has occurred in node A and if the failure is the sort in which surviving resources on the node may be reconfigured to be used by a second node, node B 020B. The failure may be of any sort previously mentioned. In various embodiments, the element, or elements, used to monitor for failures may be different than the element in block 210. In other embodiments, the element, or elements, that determines if the failure is applicable to reconfiguration of resources between nodes A 020A and node B 020B may be built into, such as with an addition, add-on, or supplement, to those that monitor for failure in 210. The element in used in block 215 may have additional logic or qualifications to the element that monitors for failure in the node. For example, an element in block 210 may determine that the failure in node A 020A has occurred. In block 215 a determination may be made that this error may qualify for reconfiguring of supporting resource between nodes if it has happened three consecutive times. This is an exemplary failure that may be determined to qualify for reconfiguration. It is contemplated that a variety of failure types and occurrences may qualify to be in the scope of the invention. The reconfiguration may be also referred to as reorganization reallocation. If no failure of the type that may qualify for reconfiguration of supporting resources between nodes is found the method may proceed back to block 210 and continue monitoring.

If, in block 215, it is determined that an error type occurred that may qualify for reorganization of supporting resources from node A 020A to node B 020B the method may proceed to block 220. In block 220 a determination is made if node A 020A contains a surviving, or operable, core. The surviving core may be in any of the cores in node A. For example, node A 020A in FIG. 1 contains four cores 002a-002d. Here it may be determined if any of the cores 002a-002d survived the failure. In various embodiments, only one core is required to survive though in various embodiments multiple cores may survive. This determination may be built into the previous hardware, software, or firmware that was used to find failures in node A 020A in block 210, or to determine if the failure was of an appropriate type for reorganization in block 215, or it may be separate software, hardware, or firmware from that previously used. If no surviving cores exist the method may end in block 225.

If the answer in block 220 is "yes" then, in block 230 a determination is made if node A 020A contains a surviving support system that may be reconfigured to node B 020B. The surviving support system may be of any type previously mentioned. For example, this may include memory controller 005A, memory buffer 006A, cache 008A, or DIMM 007A. In various embodiments, only one surviving support system may survive with other support systems either absent or failing. In other embodiments, there may be several surviving support systems that may be reconfigured. In some embodiments, some surviving support systems may only be reconfigurable if other attached support systems survive. For example, in FIG. 1 DIMM 007A may only be reconfigurable if memory bus 003A, memory controller 005A, and memory buffer 006A are also surviving support systems. This is an example only, a variety of individual and combinations of support systems required to survive a failure so to be able to be reconfigured is contemplated to be within embodiments of the invention. The determination if support systems survive the failure may be built into the previous hardware, software, or firmware that was used to find failures in node A 020A, determine if the failure was of an appropriate type for reorganization, or it may be separate software, hardware, or firmware from that previously used. If there is no surviving support system for reconfiguration to node B 020B the method may end in block 225.

If the answer in block 230 is "yes" then in block 240 node B 020B may be reconfigured to add the surviving supporting resource of node A 020A. Having determined that there is at least one surviving core among cores 02a-002d and there is a surviving supporting system in node A 020A, node B 020B may be reconfigured to add the surviving supporting system in node A 020A through fabric bus 015 and the surviving core. The fabric bus 015 and surviving core may supply a communication path for node B to use, control, or communicate with the surviving support system in node A 020A. Hardware, software, or firmware may be used to open the path in the fabric bus and in the surviving core to allow node B 020B access to the surviving support systems. In various embodiments, this may include the use of elements that may exist in the surviving core such as memory controller or memory buffer elements available. In other embodiments, the second node, node B 020B, may only use the surviving core as communication path to the surviving support system. The operations may be performed by code implemented in either or both nodes 020A and 020B or in another, third node being alerted of the failure. The method may then end at block 260.

Exemplary embodiments have been described in the context of a fully functional system for managing resources of a first node when a failure occurs in the first node. The system may include a second node adding the surviving supporting resources of the first node by using communication interfaces between the first and second node if there is a surviving core and surviving supporting resource in the first node. Readers of skill in the art will recognize, however, that embodiments also may include a computer program product disposed upon computer-readable storage medium or media (or machine-readable storage medium or media) for use with any suitable data processing system or storage system. The computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer or storage system having suitable programming means will be capable of executing the steps of a method disclosed herein as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the claims.

As will be appreciated by one skilled in the art, aspects may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used. The computer readable medium may be a computer-readable signal medium or a computer-readable storage medium. The computer readable signal medium or a computer readable storage medium may be a non-transitory medium in an embodiment. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire, optical fiber cable, RF, etc., or any suitable combination of the foregoing.

Computer program code for carrying out operations for aspects may be written in any combination of one or more programming languages, including an object-oriented programming language such as Java, Smalltalk, C++ or the like and conventional procedural programming languages, such as the C programming language or similar programming languages. The program code may execute entirely on the user's computer, partly on the user's computer, as a stand-alone software package, or on one module or on two or more modules of a storage system. The program code may execute partly on a user's computer or one module and partly on a remote computer or another module, or entirely on the remote computer or server or other module. In the latter scenario, the remote computer other module may be connected to the user's computer through any type of network, including a local area network (LAN) or a wide area network (WAN), or the connection may be made to an external computer (for example, through the Internet using an Internet Service Provider).

Aspects are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart, or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions or acts specified in the flowchart, or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions The terms "server and "mobile client" are used herein for convenience only, and in various embodiments a computer system that operates as a mobile client computer in one environment may operate as a server computer in another environment, and vice versa. The mechanisms and apparatus of embodiments of the present invention apply equally to any appropriate computing system, including a computer system that does not employ the mobile client-server model.

While this disclosure has described the details of various embodiments shown in the drawings, these details are not intended to limit the scope of the invention as claimed in the appended claims.

What is claimed is:

1. A method, comprising:
   detecting a failure in a first node, the first node comprising one or more cores and supporting resources for the one or more cores, wherein the supporting resources are designed to support a node as it operates performing tasks, and wherein the failure in the first node occurs if at least one of the one or more cores becomes inoperable;
   determining that one or more cores in the first node survived the failure, wherein one or more cores survived the failure if at least one of the one or more cores remains operable;
   determining, in response to the determining that one or more cores in the first node survived the failure, that any supporting resources of the first node survived the failure;
   accessing, in response to the determining that supporting resources of the first node survived the failure, the surviving supporting resources of the first node; and
   reallocating the accessed supporting resources of the first node to the second node using a fabric bus interface between the first node and the second node.

2. The method of claim 1, wherein the surviving supporting resources of the first node include a cache.

3. The method of claim 1, wherein the surviving supporting resources of the first node include a DIMM.

4. The method of claim 1, wherein the failure is a hardware failure.

5. The method of claim 1, wherein the failure is a microcode error.

6. The method of claim 1, wherein the supporting resources are shared and accessed by the one or more cores.

7. The method of claim 1, wherein the surviving cores remain accessible by using a fabric bus between the first and second node after the failure.

8. The method of claim 1, wherein the failure is an error caused by the first node being in service mode.

9. The method of claim 1, wherein the reallocation uses dynamic logical partitioning.

10. The method of claim 1, wherein any changes to the first node or the second node are made through dynamic logical partitioning, wherein dynamic logical partitioning includes changing resource allocation in and of nodes without restart of the node.

11. A computer-readable storage medium having executable code stored thereon to cause a machine to manage resources of a first node, comprising:
    detecting a failure in a first node, the first node comprising one or more cores and supporting resources for the one or more cores, wherein the supporting resources are designed to support a node as it operates performing tasks, and wherein the failure in the first node occurs if at least one of the one or more cores becomes inoperable;
    determining that one or more cores in the first node survived the failure, wherein one or more cores survived the failure if at least one of the one or more cores remains operable;
    determining, in response to the determining that one or more cores in the first node survived the failure, that any supporting resources of the first node survived the failure;
    accessing, in response to the determining that supporting resources of the first node survived the failure, the surviving resources of the first node; and
    reallocating the accessed supporting resources of the first node to the second node using a fabric bus interface between the first node and the second node.

12. The computer-readable storage medium of claim 11, wherein the surviving supporting resources of the first node include a cache.

13. The computer-readable storage medium of claim 11, wherein the surviving supporting resource of the first node is includes a DIMM.

14. The computer-readable storage medium of claim 11, wherein the failure is a hardware failure.

15. The computer-readable storage medium of claim 11, wherein the failure is a microcode error.

16. The computer-readable storage medium of claim 11, wherein the supporting resources are shared and accessed by the one or more cores.

17. The computer-readable storage medium of claim 11, wherein the surviving cores remain accessible by using a fabric bus between the first and second node after the failure.

18. The computer-readable storage medium of claim 11, wherein the failure is an error caused by the first node being in service mode.

19. The computer-readable storage medium of claim 11, wherein the reallocation uses dynamic logical partitioning.

20. The computer-readable storage medium of claim 11, wherein any changes to the first node or the second node are made through dynamic logical partitioning, wherein dynamic logical partitioning includes changing resource allocation in and of nodes without restart of the node.

* * * * *